(12) United States Patent
Hofmann et al.

(10) Patent No.: US 7,578,555 B2
(45) Date of Patent: Aug. 25, 2009

(54) MOTOR VEHICLE SEAT

(75) Inventors: Jochen Hofmann, Marktgraitz (DE); Gregor Kröner, Bischberg (DE); Ingo Quast, Coburg (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 210 days.

(21) Appl. No.: 11/632,270

(22) PCT Filed: Jun. 20, 2005

(86) PCT No.: PCT/DE2005/001123

§ 371 (c)(1),
(2), (4) Date: Jan. 11, 2007

(87) PCT Pub. No.: WO2006/007809

PCT Pub. Date: Jan. 26, 2006

(65) Prior Publication Data
US 2007/0236065 A1    Oct. 11, 2007

(30) Foreign Application Priority Data
Jul. 16, 2004  (DE) .................. 20 2004 011 388 U

(51) Int. Cl.
  *A47C 1/00*    (2006.01)
(52) U.S. Cl. .................................... 297/341
(58) Field of Classification Search ............. 297/344.1, 297/344.13, 344.15
See application file for complete search history.

(56) References Cited

U.S. PATENT DOCUMENTS

| | | | |
|---|---|---|---|
| 4,189,957 A * | 2/1980 | Gedig et al. ................... 74/535 |
| 4,712,759 A * | 12/1987 | Sugama et al. .............. 248/429 |
| 4,844,542 A * | 7/1989 | Humer ........................ 297/341 |
| 5,547,159 A | 8/1996 | Treichl et al. | |
| 5,596,910 A * | 1/1997 | Bauer et al. ................... 74/526 |
| 5,597,206 A * | 1/1997 | Ainsworth et al. ...... 297/378.12 |
| 5,782,138 A * | 7/1998 | Groche ......................... 74/527 |
| 5,855,349 A | 1/1999 | Nini et al. | |

(Continued)

FOREIGN PATENT DOCUMENTS

DE        43 33 892 A1    4/1995

(Continued)

OTHER PUBLICATIONS

English translation of parts of DE 202 10 895 U1 listed above.

(Continued)

*Primary Examiner*—David Dunn
*Assistant Examiner*—James Alex
(74) *Attorney, Agent, or Firm*—Christie, Parker & Hale, LLP

(57) ABSTRACT

A motor vehicle seat includes a seat frame, a backrest, a longitudinal rail guide, a fixing device for locking the longitudinal rail guide in a pre-set longitudinal seating position, a coupling mechanism which is able to move together with the seat frame in the longitudinal rail direction, a memory unit, an adjustment device configured to adjust the memory unit, and a locking device for the memory unit for the locking of a set memory position. The locking device for locking the memory unit includes a locking element configured to be engageable with at least one locking point of the locking rail associated with the fixing device.

35 Claims, 11 Drawing Sheets

U.S. PATENT DOCUMENTS

| | | | | |
|---|---|---|---|---|
| 5,927,809 | A * | 7/1999 | Tame | 297/341 |
| 5,944,383 | A * | 8/1999 | Mathey et al. | 297/341 |
| 6,048,030 | A * | 4/2000 | Kanda et al. | 297/341 |
| 6,102,478 | A * | 8/2000 | Christopher | 297/341 |
| 6,152,533 | A * | 11/2000 | Smuk | 297/341 |
| 6,631,952 | B1 | 10/2003 | Liebetrau et al. | |
| 6,767,063 | B1 * | 7/2004 | Abdella et al. | 297/378.12 |
| 6,799,800 | B2 * | 10/2004 | Klahold et al. | 297/341 |
| 6,935,692 | B2 * | 8/2005 | Nishide et al. | 297/344.11 |
| 7,017,994 | B2 * | 3/2006 | Suck et al. | 297/341 |
| 7,172,253 | B2 * | 2/2007 | Haverkamp | 297/378.1 |
| 7,380,885 | B2 * | 6/2008 | Fischer et al. | 297/378.12 |
| 2004/0046433 | A1 * | 3/2004 | Nishide et al. | 297/344.11 |
| 2004/0066079 | A1 * | 4/2004 | Schwerdtner et al. | 297/378.12 |
| 2004/0140704 | A1 * | 7/2004 | Abdella et al. | 297/344.11 |
| 2004/0256900 | A1 * | 12/2004 | Kammerer | 297/344.15 |
| 2005/0156455 | A1 * | 7/2005 | Deptolla | 297/378.12 |
| 2006/0261658 | A1 * | 11/2006 | Fischer et al. | 297/378.1 |
| 2007/0063565 | A1 * | 3/2007 | Habedank et al. | 297/341 |

FOREIGN PATENT DOCUMENTS

| | | |
|---|---|---|
| DE | 202 10 895 U1 | 9/2002 |
| EP | 0 135 596 | 4/1985 |
| EP | 0 683 066 | 11/1995 |
| WO | WO 97/03861 | 2/1997 |
| WO | WO 98/25785 | 6/1998 |
| WO | WO 00/55002 | 9/2000 |

OTHER PUBLICATIONS

English translation of International Preliminary Examination Report dated Jan. 16, 2007, for PCT/DE2005/001123.

* cited by examiner

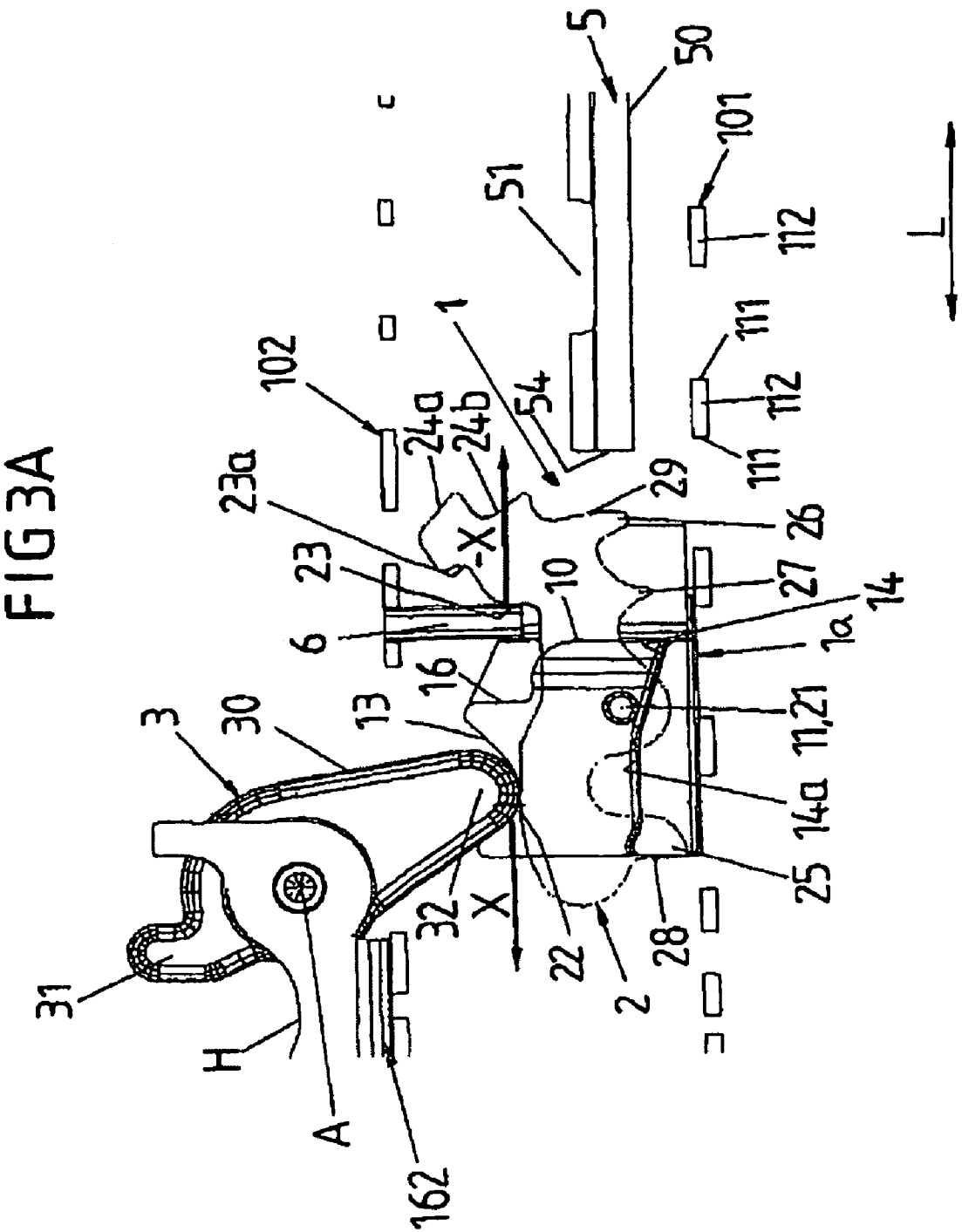

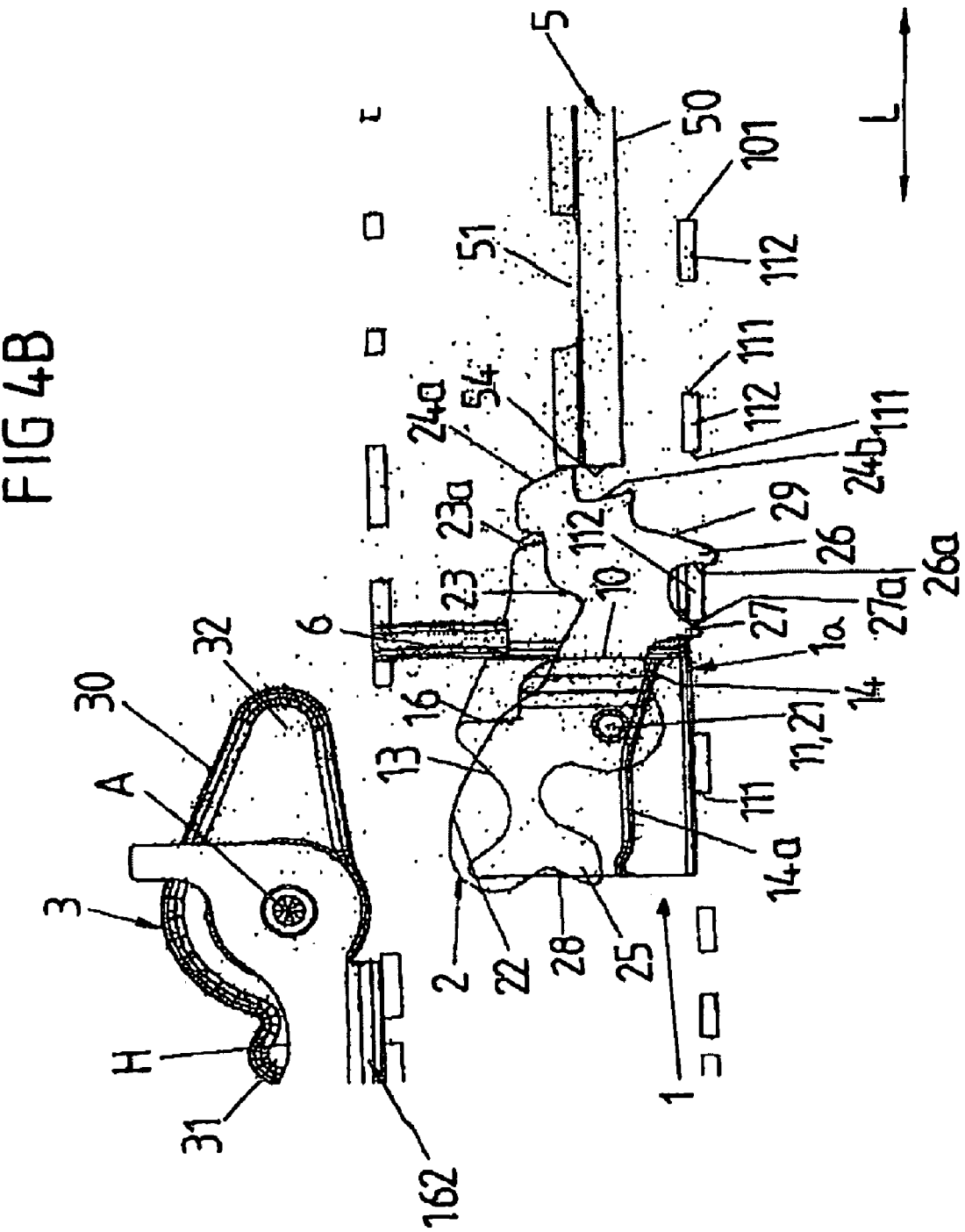

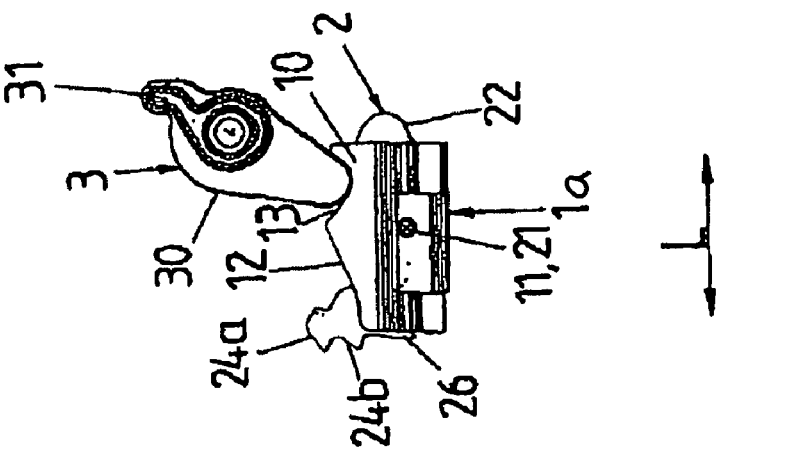
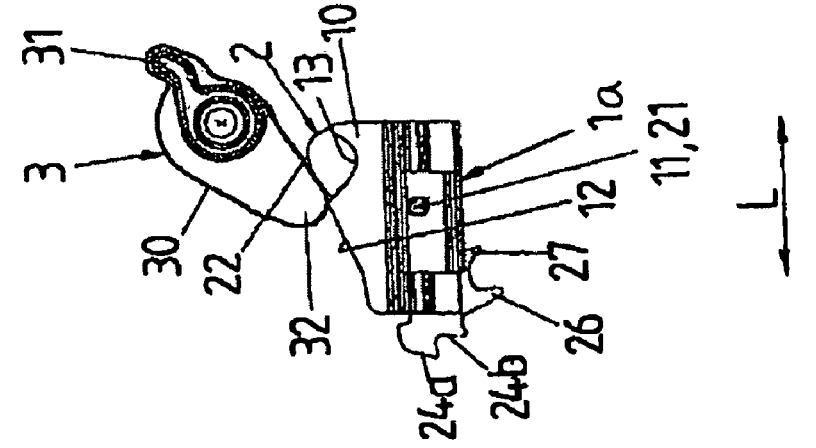
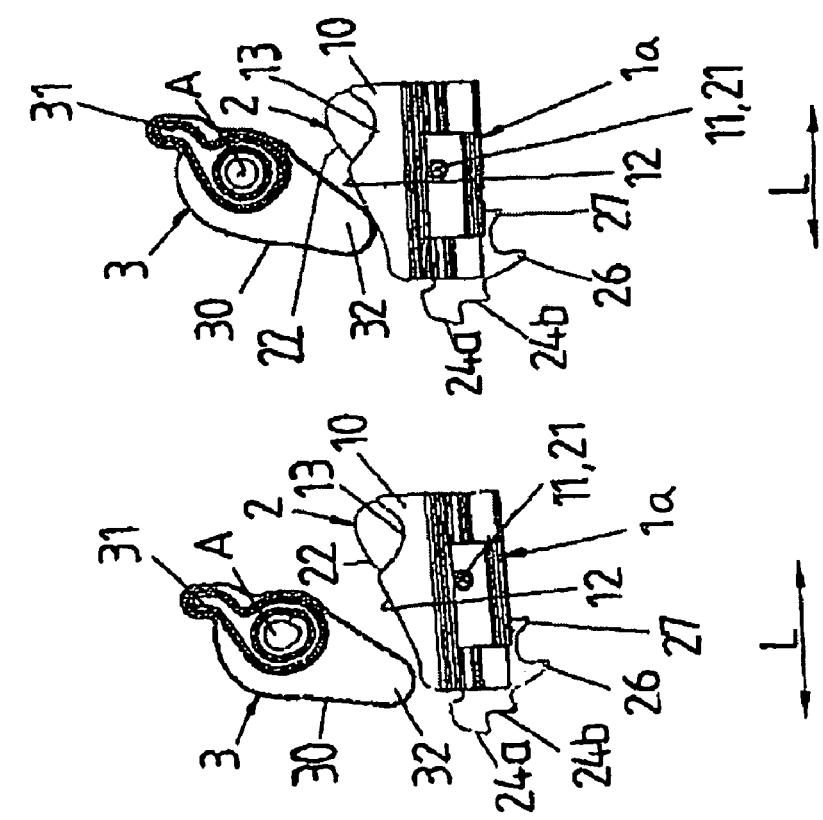

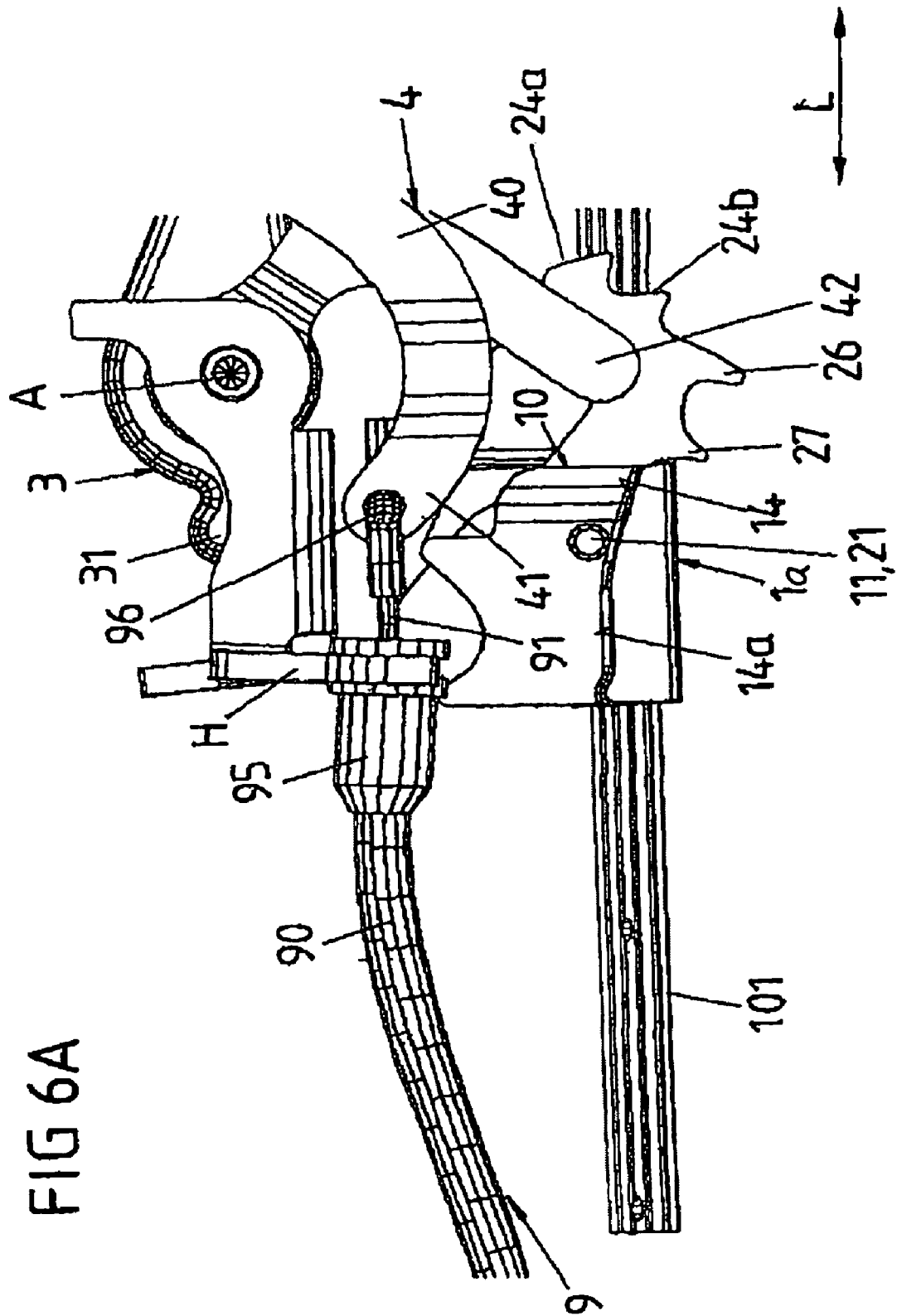

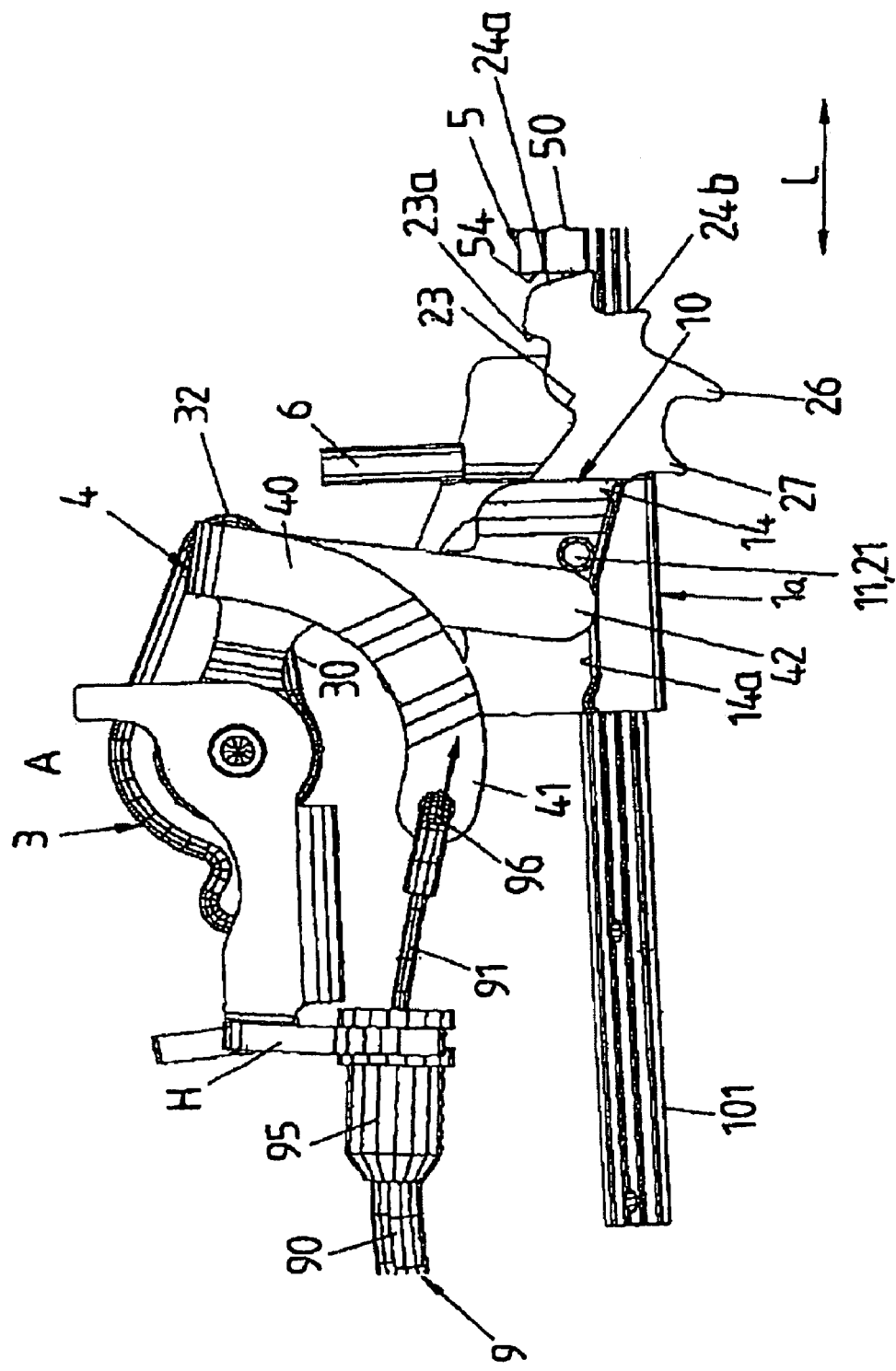

MOTOR VEHICLE SEAT

CROSS-REFERENCE TO A RELATED APPLICATION

This application is a National Phase Patent Application of International Patent Application Number PCT/DE2005/001123, filed on Jun. 20, 2005, which claims priority of German Patent Application Number 20 2004 011 388.0, filed on Jul. 16, 2004.

BACKGROUND

The invention relates to a motor vehicle seat.

Such a motor vehicle seat comprises a seat frame; a backrest which is mounted on the seat frame and which may be folded down in the direction of a seat surface of the seat frame from its respective, substantially upright position of use (in which it is adjusted to support the back of a vehicle passenger); a longitudinal rail guide with which the seat frame may be moved in a longitudinal rail direction for adjusting the longitudinal seating position; a fixing device with at least one movably mounted locking element for locking the longitudinal rail guide in a pre-set longitudinal seating position to which a locking rail, extending in the longitudinal rail direction with a plurality of locking points which are successively arranged in the longitudinal rail direction, is associated, into which locking points the locking element is able to engage for locking the longitudinal rail guide; a coupling mechanism between the fixing device and the backrest and which is able to move together with the seat frame in a longitudinal rail direction and which unlocks the fixing device when the backrest is folded down onto the seat surface; a memory unit by means of which the seat frame is able to be automatically stopped in a predeterminable longitudinal seating position, defined as a memory position, when movement occurs in the longitudinal rail direction; means for adjusting the memory unit (for example in the form of a sliding element), with which the memory position may be adjusted in the longitudinal rail direction; and a locking device for the memory unit for the locking of a set memory position.

Such seats are used as front seats in motor vehicles, in particular in two-door motor vehicles, in order to facilitate the boarding of a passenger or sliding an object into the back of the motor vehicle by folding down the backrest. In this connection, an additional means for facilitating the boarding is achieved by the seat being able to be displaced to the front, after folding down the backrest, by unlocking the fixing device.

The longitudinal rail guide serves to displace the seat frame and comprises a guide rail to be arranged fixed to the vehicle and a guide rail on the seat side carrying the seat frame. The two guide rails engage in one another, such that the guide rail on the seat side may be displaced in the direction of extension of the longitudinal rail guide (longitudinal rail direction) on the guide rail to be arranged fixed to the bodywork, in order to displace the seat frame in the longitudinal rail direction, i.e. to readjust the longitudinal seating position.

All components of the supporting seat construction which are movable in the longitudinal rail direction are respectively understood, in the present case, to be the seat frame, i.e. in particular also those components of the longitudinal rail guide, such as for example the guide rail (upper rail) on the seat side, which are moved when adjusting the longitudinal seating position in the longitudinal rail direction.

The locking rail of the longitudinal rail guide, comprising a plurality of locking points arranged successively in the longitudinal rail direction, and into which at least one locking element may engage for locking the longitudinal rail guide in a specific longitudinal seating position, is generally combined with the guide rail of the longitudinal rail guide, to be arranged fixed to the bodywork, into one structural unit. In particular, the locking rail may be integrated in one piece into the guide rail, to be arranged fixed to the bodywork, by the locking points thereof being formed directly in the guide rail itself, to be arranged fixed to the bodywork.

A motor vehicle seat of the aforementioned type is known from WO 00/5002 A1 and firstly offers the possibility, after folding down the backrest in the direction of the seat surface, of displacing the seat frame and thus the entire vehicle seat, to the front, in order to facilitate the boarding of a passenger into the back of a motor vehicle (easy entry function). Secondly, the seat may be subsequently very easily displaced again into its original longitudinal seating position, if said longitudinal seating position has been stored as a memory position by means of the memory unit provided therefor. In this case, the seat frame is automatically stopped in the memory position when pushed back, a stop associated with the memory unit cooperating with a counter stop associated with the seat frame.

SUMMARY

The problem of the invention is to improve further a motor vehicle seat of the aforementioned type.

According to the invention the locking device comprises a locking element for locking the memory unit in a specific longitudinal seating position, which may be brought into engagement with the locking points of the locking rail associated with the fixing device, for locking the memory unit.

The solution according to the invention leads to an increased simplicity of the construction of a motor vehicle seat with easy entry function as, for locking the fixing device of the longitudinal rail guide, on the one hand, and the memory unit, on the other hand, only one single locking rail is used, into which both the locking elements of the fixing device and the locking element of the memory unit may engage.

The invention is based on the recognition that the fixing device of the longitudinal rail guide, on the one hand, and the locking device of the memory unit, on the other hand, may use the same locking points of a locking rail for locking in position and/or locking, without restricting the function of the fixing device or the locking device. According to its object, therefore, to stop the motor vehicle seat once again in its previous position (memory position), when pushed back from an advanced position which has been reached after folding down the backrest to carry out the easy entry function, the locking device of the memory unit only has to be locked, therefore, when the motor vehicle seat is displaced to the front with the backrest folded down and/or pushed back again from its advanced position. Provided, however, that the easy entry function is carried out, it is not necessary to lock the longitudinal rail guide by means of the fixing device provided therefor. The easy entry function is, therefore, characterized by the free displaceability of the two guide rails relative to one another after folding down the backrest. Thus, only after carrying out the easy entry function do the locking points of the locking rail have to be able to be usable again for locking the longitudinal rail guide in position, by means of the fixing device; in turn, however, there is no longer any requirement for permanently locking the memory unit.

The solution according to the invention leads to a reduction in the number of components required to provide both a fixing device for locking the longitudinal rail guide in position and a lockable memory unit.

As the locking rail, which is provided for locking the longitudinal rail guide in position and thus the seat frame as a whole in a specific longitudinal seating position, is of very stable design, so that it may receive for example correspondingly high forces in the event of a crash, it is advantageous to introduce the forces which occur when the memory position is reached on the memory unit, directly into said locking rail, via the locking element of the memory unit. As a result, the further components of the memory unit are unloaded, so that, for example, a displaceable sliding element serving as a means for adjusting the memory unit and an associated slide rail on which the sliding element is longitudinally displaceably mounted, may be inexpensively produced from lightweight plastics.

The locking rail may, therefore, be easily integrated into the guide rail of the longitudinal rail guide to be arranged fixed to the bodywork, by the locking points being provided in and/or on said guide rail.

The engagement region of the locking element of the memory unit, via which region the locking element may be brought into engagement with the locking rail, is preferably configured such that the engagement region selectively may engage positively in one locking point or two (adjacent) locking points of the locking rail, spaced apart from one another. To this end, the engagement region of the locking element comprises, for example, two latching teeth spaced apart from one another in the direction of extension of the guide rails (longitudinal rail direction) and which are adapted to the geometry and spatial arrangement of the locking points of the locking rail, such that they both engage with their outer contour in a locking point or each one in one respective locking point, in the latter case the engagement region engaging over a web located between two locking points of the locking rail. As a result, the number of possible locking positions of the locking element is maximized along the locking rail and thus allows a particularly closely-stepped adjustment of the memory position.

According to a preferred development of the invention, the engagement region of the locking element comprises at least one oblique face by means of which the engagement region may bear without clearance against the edge of an associated locking point in the form of a locking aperture. A surface of the engagement region is, therefore, understood to be an oblique face, which extends inclined at an angle of less than 90° (i.e. not perpendicular) to the locking rail provided with the locking apertures. Specifically, the latching teeth of the engagement region may be of conical configuration i.e. may comprise latching edges extending obliquely which may be brought to bear against the edge of one respective locking aperture.

The locking element is preferably pivotably mounted on the means for adjusting of the memory unit (in the form of a sliding element), so that it has to be pivoted to be brought into engagement with the locking rail and to be lifted out of the locking apertures of the locking rail. In this case, in the locked state, the locking element has a variable angular position depending on whether the engagement region thereof engages in one or two locking points of the locking rail.

So that such a locking element may undertake the additional function of stopping the seat frame when reaching the memory position, by a stop of the locking element coming to bear against a counter stop of a structural unit which may be displaced together with the seat frame, the locking element comprises two stop faces spaced apart from one another. The one stop face always serves, therefore, as a stop if the locking element engages via its engagement region in just one locking point, whilst the other stop face serves as a stop if the locking element engages via the engagement region with two locking points. To this end, the two stop faces are arranged above one another transversely to the direction of extension of the longitudinal rail guide (i.e. transversely to the longitudinal rail direction) and additionally arranged successively in the longitudinal rail direction, the upper stop face which is transverse to the longitudinal rail direction being located in the longitudinal rail direction in front of the lower stop face.

The two stop faces themselves are preferably configured obliquely, such that they act against the lifting of the locking element out of the locking rail, when the counter stop on the seat frame side bears against one respective stop face.

The counter stop on the seat frame side may, therefore, in particular be configured on the fixing device, preferably a support, a guide body or housing of the fixing device.

A control element is provided to control the bringing of the locking element into and out of engagement with the locking rail. Said control element cooperates with the locking element in order to ensure that the locking element engages in the locking rail and locks the memory unit, when the backrest is folded down, for implementing the memory function. To this end, for example, it may be provided that the locking element is resiliently pretensioned in the direction of the state in which it is located in engagement with the locking rail. If the seat is located with the backrest arranged in the position of use, i.e. substantially upright, in the memory position, the control element acts on the locking element such that it is lifted out of the locking rail, the control element preferably being pretensioned (preloaded) in the direction of a position in which it acts in the disclosed manner on the locking element. With a readjustment of the longitudinal seating position of the motor vehicle seat with the backrest located in the position of use (as when implementing a comfort function) a new memory position is then simultaneously set, corresponding to the readjusted longitudinal seating position of the motor vehicle seat.

When folding the backrest down to implement the easy entry function, the control element, on the other hand, releases the locking element, so that said locking element now comes into engagement with the locking rail by the action of the resilient pretensioning, and stores the current longitudinal seating position of the motor vehicle seat as a memory position. To this end, the control element may be coupled to the backrest via a Bowden cable, for example.

The control element is preferably configured as a control lever, which is resiliently pretensioned in the direction of a position in which it acts on the locking element, such that said locking element is lifted out of the locking rail and which is transferred into a position in which it releases the locking element, counter to said pretensioning, when the backrest is folded down.

Furthermore, a locking mechanism may be assigned to the backrest, with which the backrest may be locked in its position folded down onto the seat surface, so that it remains permanently in the folded-down position whilst the memory function is implemented. A release element which may be moved together with the seat frame, for example mounted on the rail on the seat side, is associated with this locking mechanism, which is actuated when the memory position is reached and is coupled to the unlocking mechanism of the backrest (for example via a Bowden cable) such that it unlocks the locking mechanism when reaching the memory position. To this end, a contact face, for example in the form of a ramp, may be provided on the memory unit, with which the release element, preferably configured as a pivotably mounted release lever, cooperates when the memory position is reached, the release element being actuated such that it unlocks the folded-down backrest. By using a ramp (for example an inclined plane) as a contact face, a hard impact with a stop is thereby avoided.

The control element which causes the locking of the memory unit when the backrest is folded down, and the release element which, when reaching the memory position after implementing the easy entry function causes the unlocking of the folded-down backrest, are preferably pivotably mounted on the same axis. This axis may be displaced together with the seat frame in the longitudinal rail direction, i.e. in particular arranged on the guide rail of the longitudinal rail guide on the seat side.

As the forces exerted on the stop provided on the locking element of the memory unit, when striking the counter stop on the seat frame side, may be introduced via the locking element directly into the very stable locking rail, the sliding element on which the locking element is pivotably mounted, and the slide rail provided to guide the sliding element, are able to be inexpensively produced from plastics.

The control element, with which the bringing into and out of engagement of the locking element of the memory unit may be controlled by the locking rail, may furthermore serve, when the backrest is located in the position of use and when the memory unit is accordingly unlocked, as a drive element acting on the means for adjusting (a sliding element) of the memory unit, such that with a displacement of the seat with the backrest located in the position of use, the memory position is automatically readjusted via the means for adjusting according to the displacement of the motor vehicle seat. To this end, when the backrest is folded upward, the control element is positively engaged with the locking element of the memory unit and/or the sliding element serving as means for adjusting of the memory unit.

If the memory position is reached after implementing the easy entry function with the upright backrest, namely in the case of a vehicle seat which may not be locked in its folded-down position, the control element slides over a control surface of the locking element of the memory unit, said control element being lifted out of the locking rail and, moreover, coming into positive engagement with the locking element or the associated sliding element of the memory unit, so that during further movement of the motor vehicle seat, with the backrest located in the position of use, the memory position may be readjusted. The memory position thus always represents the last longitudinal seating position reached, with the backrest located in the position of use.

To act on the means for adjusting of the memory unit, i.e. in particular on a sliding element of the memory unit, a separate drive element, independent of the control lever, may be further provided, with which the locking element of the memory unit mounted on the sliding element comes into positive engagement, when said sliding element is lifted out of the locking rail.

The control lever, on the one hand, and the separate drive element, on the other hand, may complement one another when the means for adjusting of the memory unit are driven, namely in which one of the two components is provided for driving in a first direction parallel to the longitudinal rail direction and the other component is provided for driving in the opposite direction. Furthermore, redundancy may be also provided in at least one of the two possible drive directions, by both the control lever and the separate drive element being able to be effective when driven.

Provided that the locking element may not be brought immediately into engagement with a locking point of the locking rail, when the backrest is folded down from its position of use in the direction of the seat surface for implementing the easy entry function, but a further slight displacement in the longitudinal rail direction might be required therefor until the locking element is located with its engagement region level with a locking point, the drive element may also undertake the function of conveying the adjusting means, including the locking element mounted thereon, to the next latching position. This may have the result that when the locking element is not fully engaged in a locking point, a stop of the locking element provided therefor cooperates with the drive element and only comes out of contact with the drive element when the locking element is completely engaged in at least one locking point of the locking rail.

BRIEF DESCRIPTION OF THE DRAWINGS

Further features and advantages of the invention will become clear from the following description of an embodiment, with reference to the figures, in which:

FIG. 3a is a schematic sectional side view of the memory unit of FIG. 1 when the upright backrest is located in the position of use.

FIG. 4b is a schematic sectional side view of the memory unit of FIG. 1 with the backrest folded down, the locking element of the memory unit being engaged in two locking apertures of an associated locking rail.

FIGS. 5a-5d are schematic views of the action of a control lever of the memory unit on the locking element of the memory unit, when the memory position is reached when the upright backrest of the vehicle seat is located in the position of use.

FIG. 6a is a side view of the memory unit of FIG. 1 when the backrest is folded down and locked in the folded-down position.

FIG. 6b is the side view according to FIG. 6a during the unlocking of the folded-down backrest.

DETAILED DESCRIPTION

Figure 7:
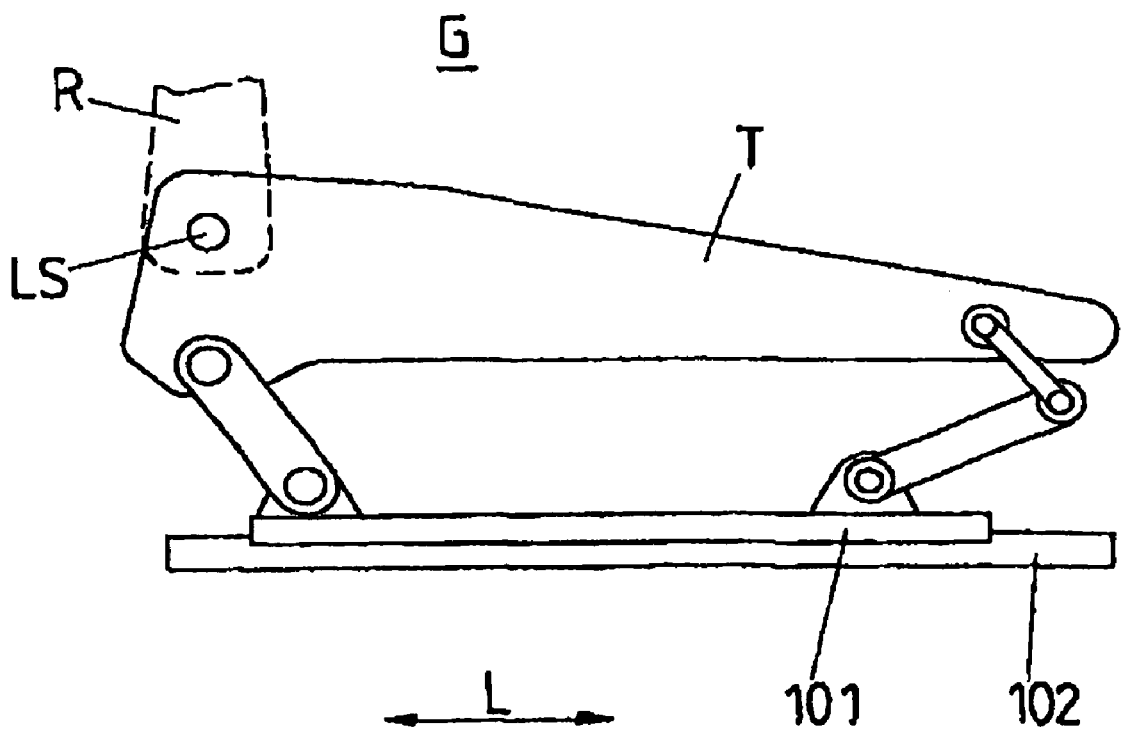
FIG. 7 is a schematic view of a seat frame of a motor vehicle seat.

A seat frame G (lower seat frame) shown schematically in FIG. 7 in side view comprises a guide rail 102 (seat rail) on the seat side, which is movably mounted in the longitudinal rail direction L on a guide rail 101 (lower rail) to be fastened to the vehicle bodywork, and a side seat part T which is articulated in a height adjustable manner via front and rear articulated levers on the seat rail 102. On the other longitudinal side, not visible in FIG. 7, the seat frame G has a corresponding arrangement. Between the two side seat parts of the seat frame G, a seat support extends for receiving a seat cushion, on the seat surface of which a vehicle passenger is able to sit.

The side parts T of the seat frame G further comprise one respective bearing LS for the pivotable mounting of a backrest R indicated in dotted lines in FIG. 7.

In the present case, respectively all those frame components which may be moved on the lower rail 101 which is fixed to the bodywork in the longitudinal rail direction L, are understood to be parts of the seat frame, i.e. in particular the seat rail 102, the side seat part T and the further components of the seat connected thereto, such as for example the articulated levers serving for the height adjustment and the backrest R.

If such a vehicle seat which may be adjusted in the longitudinal direction L is used for a two-door vehicle, it is known to couple the backrest to the longitudinal seat adjustment system, to facilitate boarding into the back of the vehicle, such that when folding the backrest R down in the direction of the seat surface extending between the side seat parts T, a fixing device associated with the longitudinal rail guide 101, 102 is unlocked and the seat may be advanced with the folded-down backrest. This simplified boarding is usually denoted as easy entry function.

If, after folding the backrest down onto the seat surface and the subsequent displacement into an advanced position facilitating boarding, the vehicle seat is intended to be pushed back again into its initial position (before implementing the easy entry function), a so-called memory unit facilitates finding the original seating position again. By means of a memory unit, when folding the backrest R down onto the seat surface of a vehicle seat, the current longitudinal seating position of the seat frame G may be stored and the seat stopped automatically again in the longitudinal seating position which is stored as the memory position when pushed back out of the advanced position, a counter stop of a structural unit which may be displaced together with the seat frame G striking a stop of the memory unit.

Such motor vehicle seats with easy entry function and memory function are known. For further details relating thereto, reference is made for example to WO 00/55002 A1.

A particular embodiment of a memory unit for a motor vehicle seat with easy entry function is described below in more detail with reference to FIGS. 1 to 6c.

Figure 1:
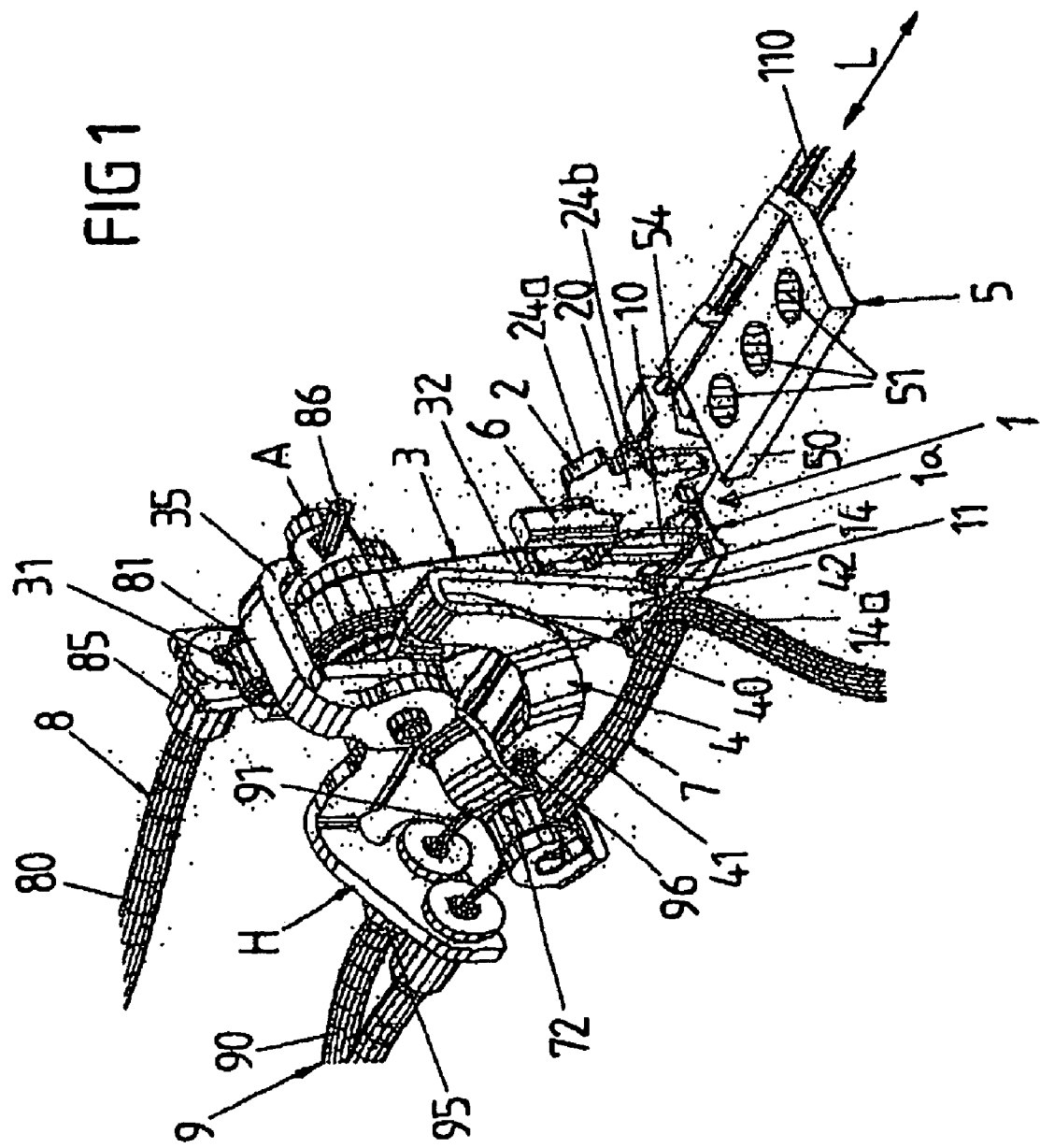
FIG. 1 is a perspective view of a memory unit for a motor vehicle seat, which may be advanced with the backrest folded down to facilitate boarding.

FIG. 1 shows the essential components of a memory unit for a motor vehicle seat with easy entry function of the type shown in FIG. 7.

The memory unit 1 comprises a sliding element 1a as means for adjusting which is longitudinally displaceably mounted on a slide rail extending in the longitudinal rail direction 110 and of which the body 10 has an axis 11 for pivotably mounting a locking element 2 of the memory unit 1. The sliding element 1a may be displaced, in the longitudinal rail direction L in various longitudinal positions on the slide rail 110, which preferably is combined with the lower rail 101, to be arranged fixed to the bodywork, of the longitudinal rail guide shown in FIG. 7 into a structural unit, in which longitudinal positions it may then be locked by pivoting the locking element 2 mounted pivotably on the body 10 of the sliding element 1a. Both the sliding element 1a and the associated sliding guide 110, therefore, preferably consist of plastics.

A current longitudinal position of the sliding element 1a in which the memory unit is locked by means of the locking element 2, corresponds respectively to a memory position, in which the seat frame G of the vehicle seat shown in FIG. 7, may be automatically stopped, when pushed back from an advanced position, for easy entry function. This is described in more detail hereinafter with reference to FIGS. 3a to 6c.

Figure 2:
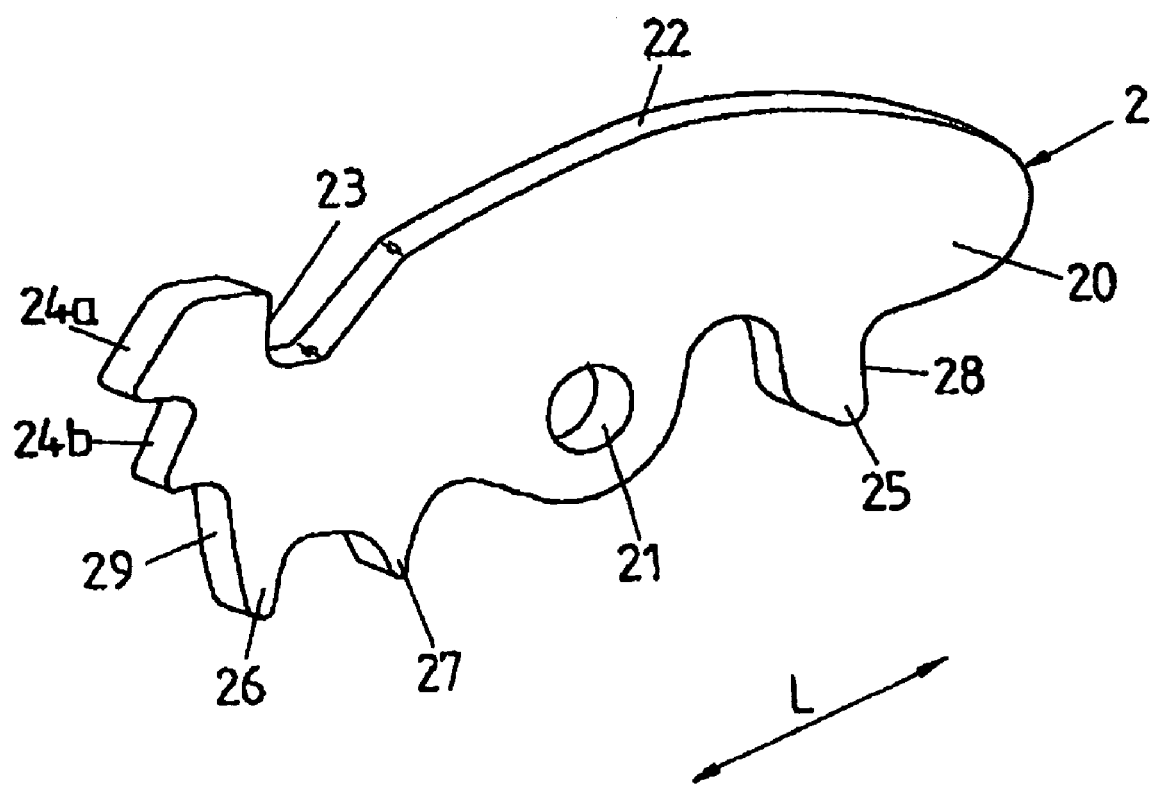
FIG. 2 is a perspective view of a locking element of the memory unit of FIG. 1.

The locking element 2 additionally shown separately in FIG. 2 and which may be advantageously configured as an inexpensive stamped part comprises a body 20 with a bearing 21 for pivotably mounting the locking element 2 on the bearing axis 11 provided therefor on the body 10 of the sliding element 1a. On the upper face of the locking element 2 a control surface 22 extends via which the locking element 2 may cooperate with a control element 3 shown in FIG. 1 in the form of a control lever, in order to control the state of the locking element. In this connection, a distinction is made between a state in which the locking element engages with its engagement region formed by two latching teeth 26, 27 in at least one locking aperture of a locking rail, so that the memory unit is locked in a specific longitudinal seating position, and a state in which the engagement region formed by the two locking teeth spaced apart from one another in the longitudinal rail direction L is lifted out of the associated locking rail, so that the memory unit 1 consisting of the sliding element 1a and the locking element 2 may be displaced for readjusting the memory position in the longitudinal rail direction L.

The locking element 2 further comprises a journal 25 for a resilient element, in particular in the form of a coil spring, which may be supported on the sliding element 1a and with which the locking element may be pretensioned in the direction of the locked state, so that the control lever 3 serves, in particular, to lift the engagement region 26, 27 of the locking element 2 out of the associated locking rail, counter to the action of each resilient element.

In order to be able to displace the memory unit 1 in the longitudinal rail direction L, if the locking element 2 is lifted out of the associated locking rail, the locking element 2 comprises on its upper face a driving region 23 formed by a stop, in which a drive element 6 connected to the seat frame G, in particular the seat rail thereof 102, (see FIG. 7) may engage, in order to drive the memory unit 1 for a readjustment of the memory position.

Stop faces 24a, 24b are further provided on one front face of the locking element 2 and which may cooperate in the locked state of the locking element with a counter stop on the seat frame side and/or on the seat rail side, in order to stop the seat frame in the current memory position.

Two further faces 28, 29 provided on opposing front faces of the locking element 2 serve as stops when the seat frame G (see FIG. 7) is moved into its rearmost position. One face 28 then comes into contact with an end stop provided on the lower rail 1 fixed to the vehicle and the other face 29 comes into contact with a counter stop configured on the guide body 50.

The control lever 3 is pivotably mounted on a lever end 31 on an axis A, which is configured on an angle bracket H fixed to the seat rail, and comprises at its other end 32 a control contour (control surface) via which it may cooperate with the locking element 2. The control lever 3 cooperates at one end 31 with the core of a Bowden cable 8 formed by a traction means 81 guided in a Bowden sleeve 80 (with a Bowden support 85). To this end, the one end 31 of the spring-mounted control lever 3 bears against a rocker 35, in which the traction means 81 is positively suspended at one end 86. Via this Bowden cable 8 the control lever 3 is coupled to the backrest R (see FIG. 7) of the seat frame G, so that it may be pivoted when folding the backrest R down onto the seat surface of the seat frame G.

On the same axis A as the control lever 3, moreover, a release lever 4 is pivotally mounted with a bearing provided in its body 40. The release lever 4 is connected, as is the control lever 3, at one end 41 to the core of a Bowden cable 9 formed by a traction means 91 guided in a Bowden sleeve 90 (with a Bowden support 95), by one end 96 of the traction means 91 being positively suspended in an aperture on said end 41 of the release lever 4. The other end 42 of the release lever 4 may cooperate with a ramp 14 of an actuating surface 14, 14a of the sliding element 1a of the memory unit 1 when the seat frame reaches the current set memory position. The release lever 4 serves to unlock a locking mechanism with which the backrest R (see FIG. 7) may be locked in its state folded down onto the seat surface, by acting on the locking mechanism via the associated Bowden cable 9 as is described further below with reference to FIGS. 6a to 6c.

The angle bracket H forms, therefore, together with the components fastened thereto, in particular the control lever 3 and the release lever 4, a preassemblable module which may be fastened to the seat rail 102 (see FIG. 7) of a seat frame in a completely preassembled form. In this connection, the release lever 4 may optionally only be provided in the case where the seat frame is equipped with a locking mechanism for locking the backrest in the folded-down state.

A further Bowden cable 7 cooperating with the backrest R serves to couple the backrest R to the fixing device 5 of the longitudinal rail guide 101, 102 (see FIG. 7) in order to be able to release said fixing device when folding the backrest R down onto the seat surface of the seat frame G in the known manner, so that the two guide rails 102, 101 may be displaced relative to one another for advancing the seat frame G. This further Bowden cable 7 is coupled to the backrest via the aforementioned rocker 35, the Bowden cable 7 being able to receive, via a remote part 72, relatively large angular movements of the rocker 35 (up to 60°). When pivoting the rocker 35, a movement of the sleeve of the Bowden cable 7 along the Bowden cable axis is effected which is used to unlock the fixing device 5.

Figure 3B:
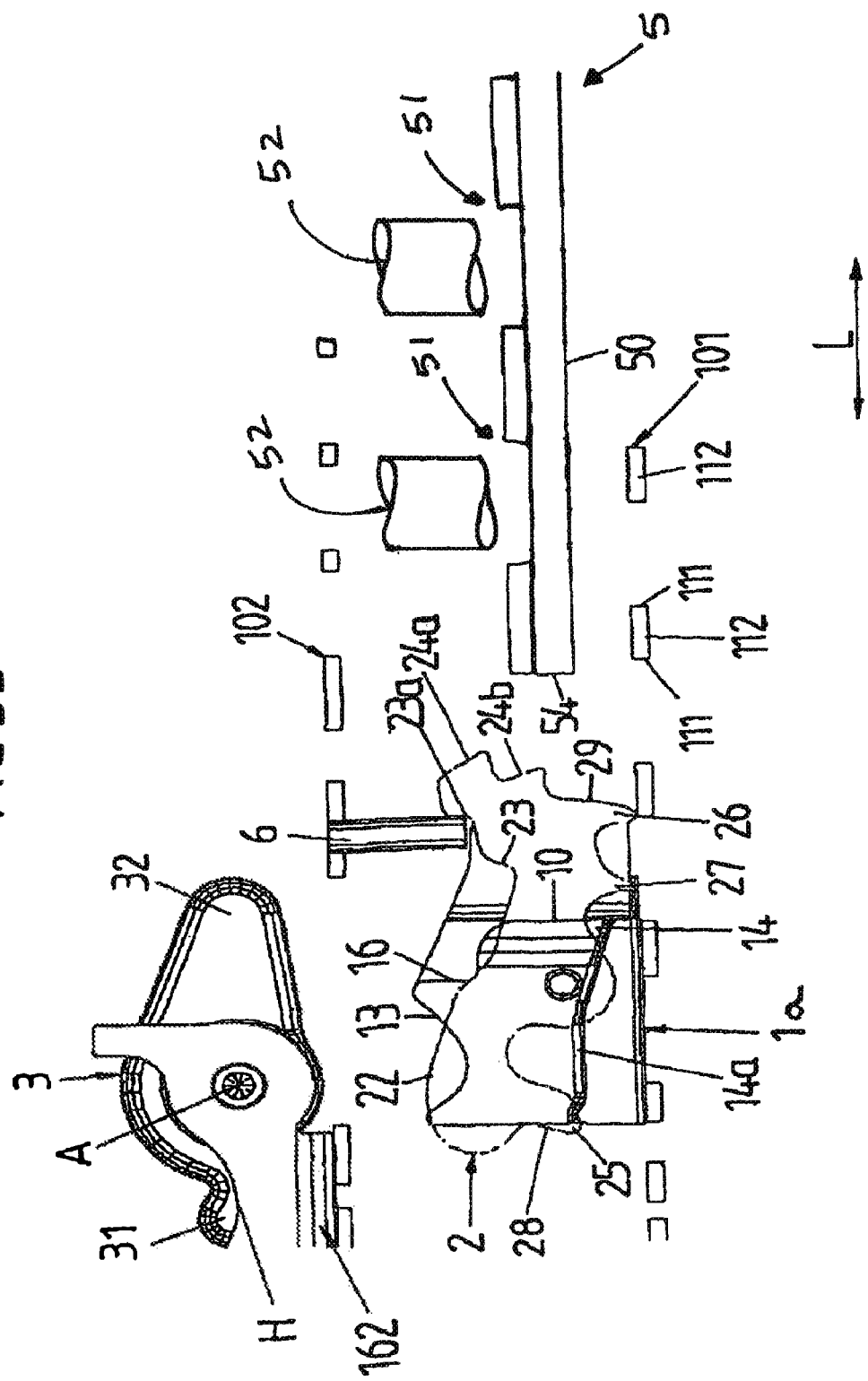
FIG. 3b is a schematic sectional side view of the memory unit of FIG. 1 with the backrest folded down, the locking element of the memory unit not yet being engaged in an associated locking rail.

Merely one guide body 50, arranged on the seat rail 102, is visible of this fixing device 5 in FIG. 1, which comprises three guide apertures 51 for longitudinally displaceably guiding the locking elements 52 (two locking elements 52 are shown in FIG. 3B) which serve to lock the two guide rails 101, 102 in position. The guide body 50 further forms the counter stop 54 which may come into engagement with one of the stop faces 24a, 24b of the locking element 2 in order to stop the seat frame in a longitudinal seating position, stored as a memory position.

FIG. 3a shows a schematic lateral sectional view of the memory unit of FIG. 1 without the release lever 4, but instead with the lower rail 101 to be arranged fixed to the vehicle and the seat rail 102 displaceably mounted thereon.

A locking rail is integrated into the lower rail 101 and which is formed by a plurality of locking apertures 111 arranged successively in the longitudinal rail direction L and separated from one another by webs 112, into which the locking teeth to be guided into the guide apertures 51 of the guide body 5 are able to engage, in order to lock in position the longitudinal rail guide 101, 102 in a previously set longitudinal position.

In this connection, the engagement region of the locking element 2 formed by the two latching teeth 26, 27 spaced apart from one another in the longitudinal rail direction L is configured such that this engagement region 26, 27 is also able to engage in the locking apertures 111 of the locking rail configured on the lower rail 101, in order to lock the memory unit 1 in a defined longitudinal position. The same locking apertures 111, therefore, are used both for locking the longitudinal rail guide 101, 102 in position, by means of locking elements guided on the guide body 50, and for locking the memory unit 1 by means of latching teeth 26, 27 provided on the locking element.

In the state shown in FIG. 3a, which corresponds to an upright backrest R (see FIG. 7) located in the position of use, the latching teeth 26, 27 of the locking element 2, however, are not in engagement with the locking apertures 111 but instead are lifted out of the locking rail 111, 112. This is because the control lever 3 with the control surface configured at one end 32 of its body 30 acts on an associated control surface 22 of the locking element 2, such that said locking element is stopped in a pivoted position in which the latching teeth 26, 27 are out of engagement with the locking rail 111, 112.

The position of the control lever 3 in which said control lever acts with the control surface configured on an end portion 32 on the associated control surface 22 of the locking element 2, corresponds to the normal position and/or normal pivoted position of the control lever 3, in the direction of which it is resiliently pretensioned by means of a spring (in particular a torsion spring). In this state, the control lever 3 acts with its end portion 32, provided with the control surface, on a driving region 13 (formed by recess of the body 10) of the body 10 of the sliding element 1a so that when displacing the seat frame with the backrest located in the position of use in at least one spatial direction x parallel to the longitudinal rail direction L, the sliding element 1a and thus the memory unit 1 are driven together by the control lever 3. When displacing the seat frame in the opposing x-direction, parallel to the longitudinal rail direction L, the driving is carried out via a separate drive element 6 fixed to the seat rail which, in this connection, acts on a corresponding drive stop 23 of the locking element 2.

Moreover, the drive element 6 serves as a redundant element when driving the memory unit 1 in the x-direction, which is intended to take place by means of the control lever 3. To this end, the drive element 6 may cooperate with a corresponding stop 16 of the sliding element 1a.

As a result, when the backrest R (see FIG. 7) is located in the upright position of use, the memory unit 1 is driven via the control lever 3 and/or the drive element 6 at every readjustment of the longitudinal seating position of the seat frame G, so that the memory position defined by the position of the memory unit 1 is respectively adapted to the current comfort position of the seat frame G in the longitudinal rail direction L. This is possible as the locking element 2, when the backrest is located in the upright position of use, is lifted by means of the control lever 3 out of the associated locking rail 111, 112.

FIG. 3b shows the arrangement according to FIG. 3a after folding the backrest R down in the direction of the seat surface of the seat frame G. In this connection, the Bowden cable 8 shown in FIG. 1 acts with its traction means 81 on the associated end 31 of the control lever 3 such that said control lever is brought, by pivoting about its axis A (counterclockwise), out of engagement with the control surface 22 of the locking element 2 and no longer acts thereon. As a result, the locking element under the action of the pretensioning of a resilient element provided therefor (not shown in the FIGS.), pivots (clockwise) such that the engagement region 26, 27 of the locking element 2 has the tendency to engage in at least one of the locking apertures 111 of the locking rail 111, 112. In the state shown in FIG. 3b this is, however, not possible as the memory unit 1 is located in a longitudinal position in which the one latching tooth 26 of the engagement region 26, 27 strikes the edge of one of the apertures 111.

In other words, in this case, after folding the backrest down onto the seat surface, the memory unit 1, 2 is not immediately locked in its current position, as the engagement region 26, 27 of the locking element 2 still rests on a web 112 of the locking rail 111, 112. Nevertheless, in this not completely engaged state of the locking element 2, the drive element 6 still bears against an upper extension 23a of the associated drive stop 23 of the locking element 2. As a result, the memory unit 1 is driven a short distance further, during the subsequent advancing of the seat frame G with the backrest R folded down, via the drive element 6 fixed to the seat rail, until the engagement region 26, 27 is able to engage fully in the next locking aperture 111 and/or the next locking apertures 111, as is shown with reference to FIGS. 4a and 4b. The memory position which is actually stored deviates only slightly from the original longitudinal seating position of the seat frame G.

Figure 4A:
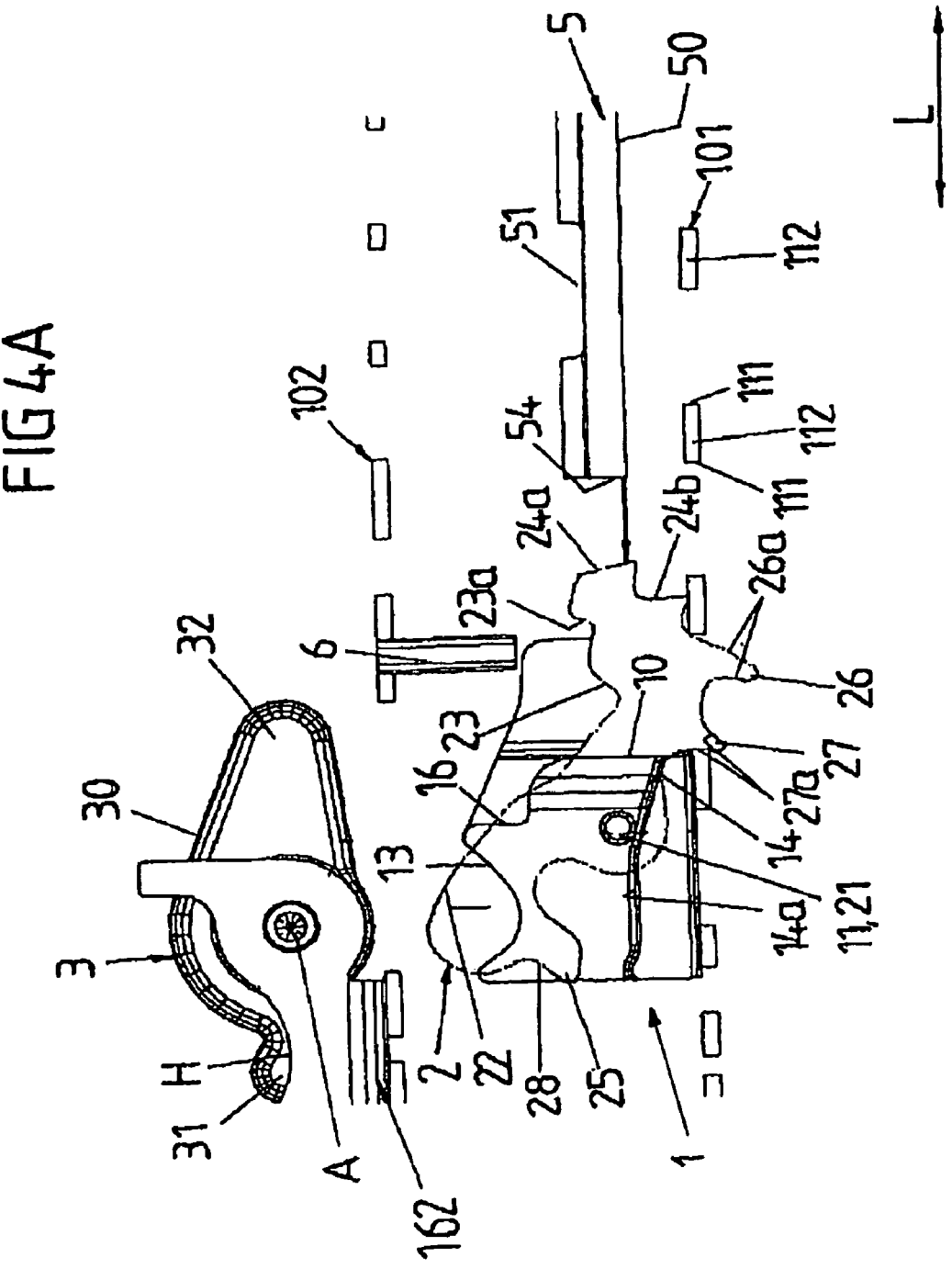
FIG. 4a is a schematic sectional side view of the memory unit of FIG. 1 with the backrest folded down, the locking element of the memory unit being engaged in a single locking aperture of an associated locking rail.
Figure 6C:
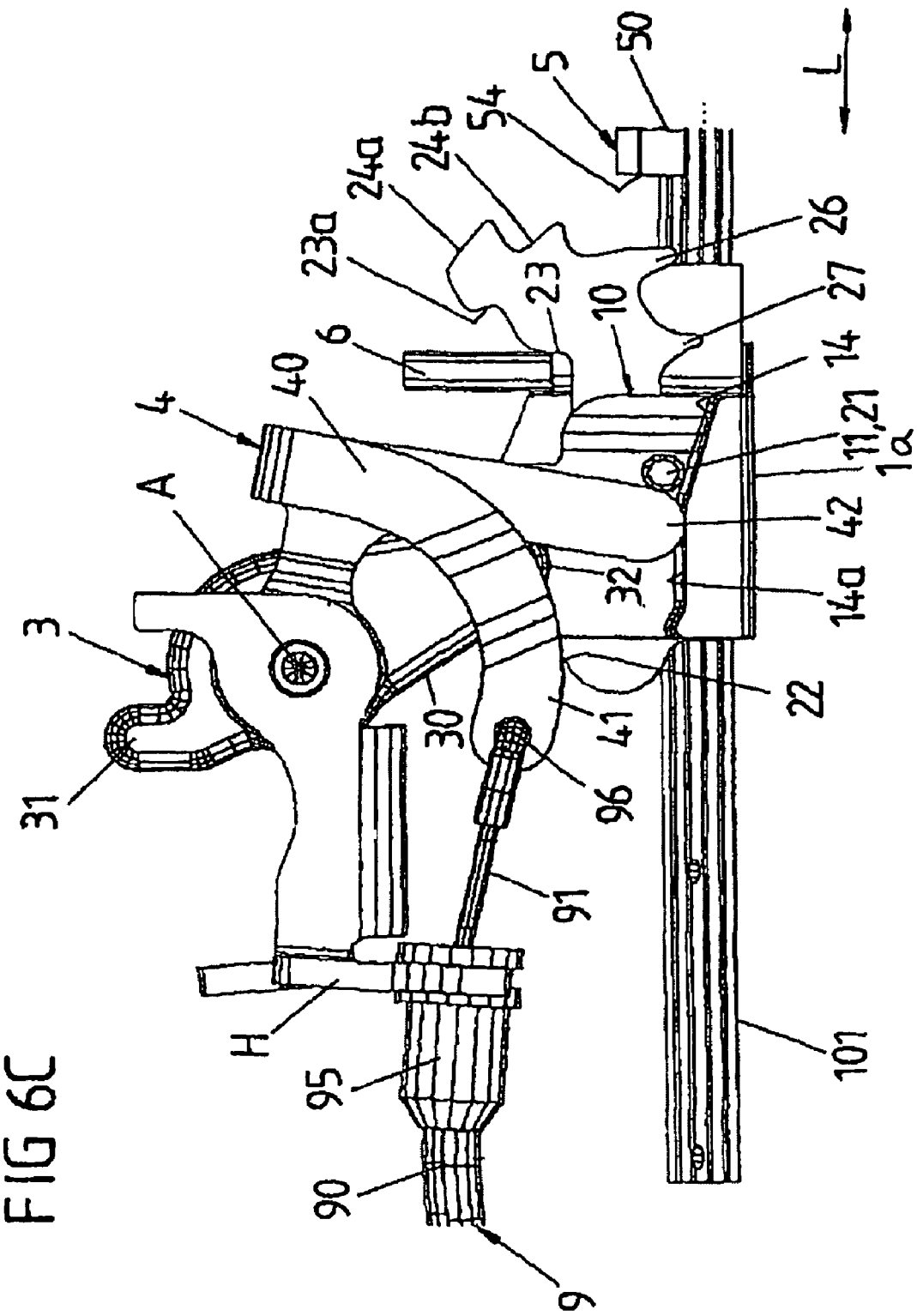
FIG. 6c is the side view of FIG. 6a after folding the unlocked backrest upward into an upright position of use.

FIG. 4a shows an arrangement according to FIGS. 3a and 3b, after folding the backrest down and pivoting the control lever 3, the locking element 2 engaging with both latching teeth 26, 27 of its engagement region in a single locking aperture 111 of the locking rail 111, 112. In this connection, the conically configured latching teeth 26, 27 bear against the edge of the corresponding locking aperture 111 with respectively one of their obliquely extending latching edges 26a, 27a, so that a locking of the memory unit, without clearance, is ensured. In this state, the upper stop face 24a of the locking element 2 serves as a stop with which the counter stop 54 configured on the guide body 50 fixed to the rail, when reaching the memory position (after carrying out the easy entry function), is able to come into engagement, in order to stop the seat frame once again in its original longitudinal seating position, stored as the memory position. The forces exerted on the associated stop face 24a of the locking element 2 when the memory position is reached by the counter stop 54, are diverted via the body 20 of the locking element 2 and the engagement region 26, 27 thereof directly into the locking rail 111, 112, so that the sliding element 1a serving to mount the locking element 2 and the associated sliding guide 110 (see FIG. 1) may be inexpensively produced from plastics, in a weight-saving manner. In particular, by the direct introduction of the forces acting on the locking element 2 into the locking rail 111, 112, the bearing axis 11 for the locking element 2, configured on the body 10 of the sliding element 1a, is unloaded. The remaining residual forces which act, however, on the sliding element 1a, press said sliding element against the locking rail 111, 112 so that these forces are also diverted into the locking rail 111, 112.

Due to the inclined extension of the stop face 24a relative to the longitudinal rail direction L (obliquely at an angle of less than 90°) the counter stop 54 configured on the guide body 50 additionally causes the engagement region 26, 27 of the locking element 2 to be lifted out of the associated locking aperture 111.

FIG. 4b shows, in a modification of FIG. 4a, a situation in which the locking element 2 engages in two locking apertures 111 with its engagement region 26, 27, namely with each latching tooth 26 and 27 in one locking aperture, the web 112 of the locking rail 111, 112 located therebetween being bridged. In this case also, the locking is again carried out without clearance by the bearing of obliquely extending latching edges 26a, 27a of the latching teeth 26, 27 on the edge of the respective aperture 111.

In this state, the engagement region 26, 27 of the locking element 2 enters less deeply into the associated latching apertures 111 than in the state shown in FIG. 4a, in which the engagement region 26, 27 enters a single locking aperture 111. Therefore in this case the second lower stop face 24b of the two stop faces 24a, 24b of the locking element 2, arranged above one another, serves for stopping the seat frame when reaching the memory position, by the counter stop 54 configured on the guide body 50 coming into engagement with said lower stop face 24b.

As is visible from FIG. 4b, the two stop faces 24a, 24b are arranged not only perpendicularly to the longitudinal rail guide L vertically above one another, but are also offset to one another in the longitudinal rail direction L. The spatial arrangement of the two stop faces 24a, 24b is selected such that the guide body 50, when striking its counter stop 54 on the respective active stop face 24a or 24b of the locking element 2, is located respectively in a position in which at least one of the locking elements guided in the guide apertures 51 of the guide body 50, may engage in an associated locking aperture 111 of the locking rail 111, 112. As a result, after reaching the memory position by folding the backrest upward, the seat frame may immediately be locked in position in the longitudinal seating position which has been reached (memory position).

Furthermore, the second, lower stop face 24b of the locking element 2 has an inclined extension relative to the longitudinal rail direction L so that the counter stop 54 has the tendency to hold the locking element 2 in the engaged state when it bears against said stop face 24b.

FIGS. 5a to 5d schematically show the memory unit 1 and the control lever 3 when reaching the memory position with the upright backrest located in the position of use. Such a situation may, for example, occur when no locking mechanism is associated with the backrest of the motor vehicle seat, by means of which the backrest may be locked whilst the easy entry function is carried out in the folded-down position.

FIG. 5a shows the approach of the control lever 3 which is oriented substantially perpendicularly, due to the backrest being located in the position of use, toward the memory unit 1 when pushing back the vehicle seat with the upright backrest located in the position of use, after implementing the easy entry function. The control lever 3 is, therefore, held by a resilient element in the normal position shown in FIG. 5a as, when the backrest is not folded down, the Bowden cable 8 (see FIG. 1) coupled to the backrest, exerts no force via the rocker 35 (as an intermediate element) onto the control lever 3.

When approaching closer to the memory position, the control lever 3 slides with its control surface provided at the lower end 32 over an associated control surface 12 of the sliding element 1a according to FIG. 5b, said sliding element being guided according to FIG. 5c onto the control surface 22 of the locking element 2 and pivoting said locking element such that it is lifted out of the associated locking rail. In this connection, the control lever 3 according to FIG. 5d enters with its lower end 32 the driving region 13 of the sliding element 1a, so that said sliding element, during a further displacement of the seat with the upright backrest, may be driven together with the entire memory unit 1. It is important in this connection that, according to FIGS. 5c and 5d, the locking element 2 is firstly lifted out of the associated locking rail and, only then or thereafter, does the control lever 3 completely engage in the driving region 13 of the sliding element 1a.

The lifting of the locking element 2 by the control lever 3 is assisted by the control lever 3, when traveling over the obliquely extending control surface 12 of the sliding element 1a which is fixed to the lower rail in the locked state of the locking element 2, being pivoted outward counter to the pre-tensioning of the resilient element associated with the control lever 3, for example in the form of a leg spring, said resilient element being further tensioned. After exceeding the highest point of the control surface and guide surface 12 of the sliding element 1a extending obliquely and/or in a ramp-like manner, the additionally created tension of the resilient element assists the pivoting of the control lever 3 into the driving region 13 of the sliding element 1*a*, the locking element 2 being pivoted and lifted out of the associated locking rail.

FIG. 6*a* shows a further sectional side view of the memory unit of FIG. 1, in this case, however, in combination with the release lever 4 for the locking mechanism of the folded-down backrest. In this connection, in FIG. 6*a*, a state is shown in which the memory unit 1 is locked in a previously set longitudinal seating position as a memory position and the seat frame is pushed back to the rear with the backrest folded down, after implementing the easy entry function, the release lever 4 pivotably articulated on a bracket H fixed to the seat frame and/or fixed to the seat rail approaching the memory unit 1. As observing FIG. 6*b* at the same time shows, the release lever 4 therefore slides with one end 42 over a ramp 14 provided on the sliding element onto a substantially horizontal support surface 14*a*, adjacent to the ramp 14, the release lever 4 being pivoted about its axis A (counterclockwise) such that it exerts a tractive force on the core 91 of the associated Bowden cable 9. At the same time, the counter stop 54 of the guide body 50 comes to bear against an associated stop face 24*a* of the locking element 2 still located in the locked state, so that the seat frame is stopped in position, after the release lever 4 has been pivoted when traveling over the ramp 14 and has reached the (horizontal) support surface 14*a* adjacent to the ramp 14.

By means of the pivoting movement of the release lever 4, a tractive force is exerted on the traction means 91 serving as a core of the associated Bowden cable 9 and suspended on the first end 41 of the release lever 4, and which leads to an unlocking of the locking mechanism of the folded-down backrest. To this end, the Bowden cable 9 is coupled to said locking mechanism in a suitable manner.

Thus the backrest may now be folded back into its upright position of use, the control lever 3 again adopting its normal position under the action of the associated leg spring, as the Bowden cable, via which the control lever 3 is coupled to the backrest, no longer acts on the control lever 3 counter to the effect of the leg spring. In this connection, the control lever 3 comes to bear with its one end 32 forming a control surface, against the associated control surface 22 of the locking element 2 and lifts said locking element out of the associated locking rail. The memory unit is then again located in the state described with reference to FIG. 3*a* in which the memory unit 1 is able to be driven for readjusting the memory position, when the seat frame is displaced with the upright backrest located in the position of use.

The invention claimed is:

1. A motor vehicle seat comprising:
a seat frame;
a backrest pivotably mounted on the seat frame and configured to be folded down in a direction of a seat surface of the seat frame;
a longitudinal rail guide configured to move the seat frame in a longitudinal rail direction for adjusting a longitudinal seating position;
a fixing device for locking the longitudinal rail guide in a pre-set longitudinal seating position with at least one movably mounted first locking element, wherein a locking rail associated with the first locking element extends along the longitudinal rail direction with a plurality of locking points which are successively arranged in the longitudinal rail direction, wherein the first locking element is configured to engage the locking points for locking the longitudinal rail guide;
a coupling mechanism configured to move together with the seat frame in the longitudinal rail direction and configured to unlock the fixing device when the backrest is folded down onto the seat surface;
a memory unit configured to automatically stop the seat frame in a predeterminable longitudinal seating position, defined as the memory position, when movement occurs in the longitudinal rail direction, the memory unit comprising:
an adjustment device configured to adjust the memory position of the memory unit in the longitudinal rail direction;
a second locking element configured to be engaged with at least one locking point of the locking rail associated with the fixing device to lock a set memory position;
wherein the second locking element has an engagement region configured to be engaged with the locking rail, and wherein the engagement region comprises two latching teeth configured to be selectively introduced into one locking point or into two adjacent locking points for locking the memory unit; and
wherein the second locking element and the latching teeth are a unitary element.

2. The motor vehicle seat of claim 1, wherein the locking points are formed by locking apertures.

3. The motor vehicle seat of claim 1, wherein the engagement region comprises stop faces, wherein the engagement region is configured to bear without clearance against the edge of the respectively associated locking aperture with the stop faces.

4. The motor vehicle seat of claim 3, wherein the latching teeth are of conical configuration and configured to bear without clearance with their latching edges formed by oblique faces against the edge of the respectively associated locking aperture.

5. The motor vehicle seat of claim 1, wherein the second locking element is pivotable in order to be brought into and out of engagement with the locking rail.

6. The motor vehicle seat of claim 5, wherein the second locking element in the locked state has a variable angular position depending on whether the engagement region of the second locking element engages in one locking point or two locking points of the locking rail.

7. The motor vehicle seat of claim 1, wherein the second locking element has a stop with which a counter stop of a structural unit configured to be displaceable together with the seat frame is configured to be brought into contact in order to stop the seat frame when reaching the memory position.

8. The motor vehicle seat of claim 7, wherein the second locking element has two stop faces spaced apart from one another, wherein one stop face is configured to come into contact with the counter stop when the engagement region is engaged in a locking point of the locking rail, and wherein the other stop face is configured to come into contact with the counter stop when the engagement region is engaged in two adjacent locking points of the locking rail.

9. The motor vehicle seat of claim 8, wherein the two stop faces are arranged above one another transversely to the longitudinal rail direction.

10. The motor vehicle seat of claim 9, wherein the two stop faces are arranged successively in the longitudinal rail direction.

11. The motor vehicle seat of claim 8, wherein the stop faces are configured such that the counter stop acts against the lifting of the second locking element out of the locking rail when it bears against one of the stop faces.

12. The motor vehicle seat of claim 11, wherein the one stop face of the second locking element cooperating with the counter stop, extends at an angle to the longitudinal rail direction, when the second locking element engages in the locking rail.

13. The motor vehicle seat of claim 1, further comprising a control element configured to control the bringing of the second locking element into and out of engagement with the locking rail, depending on whether the backrest is located in a substantially upright position of use or in a position folded-down onto the seat surface.

14. The motor vehicle seat of claim 13, wherein the control element cooperates with the backrest, wherein the control element is configured to be actuated when folding the backrest down.

15. The motor vehicle seat of claim 13, wherein the control element is formed by a control lever configured to be pivotable upon actuation.

16. The motor vehicle seat of claim 1, wherein the backrest is lockable in a position folded-down onto the seat surface with a locking mechanism.

17. The motor vehicle seat of claim 16, wherein the locking mechanism of the backrest is configured to be unlockable with a release element actuated when reaching the memory position and which is coupled to the locking mechanism of the backrest so that the locking mechanism is unlockable when reaching the memory position.

18. The motor vehicle seat of claim 17, wherein the release element is coupled to the locking mechanism of the backrest via a Bowden cable.

19. The motor vehicle seat of claim 17, wherein the release element is formed by a pivotably mounted release lever.

20. The motor vehicle seat of claim 1, further comprising a control element configured to control the bringing of the second locking element into and out of engagement with the locking rail, depending on whether the backrest is located in a substantially upright position of use or in a position folded-down onto the seat surface; and
wherein the control element and the release element are pivotably mounted on the same axis.

21. The motor vehicle seat of claim 20, wherein the axis is arranged on a structural unit configured to be displaceable together with the seat frame in the longitudinal rail direction.

22. The motor vehicle seat of claim 17, wherein the adjustment device comprises a ramp onto which the release element is moveable upward, when reaching the memory position, whereby the release element is actuated to unlock the locking mechanism.

23. The motor vehicle seat of claim 1, wherein the adjustment device comprises a sliding element, wherein the second locking element is mounted on the sliding element displaceable in the longitudinal rail direction.

24. The motor vehicle seat of claim 13, wherein the control element is configured to be positively engageable with at least one of the second locking element and the adjustment device, in order to drive the adjustment device and the second locking element for readjusting the memory position, when the seat frame is displaced in the longitudinal rail direction.

25. The motor vehicle seat of claim 24, wherein the control element comes into positive engagement with at least one of the adjustment device and the second locking element when the control element is brought into a position in which the control element acts on the second locking element in order to lift said second locking element out of the locking rail.

26. The motor vehicle seat of claim 13, wherein, when reaching the memory position with the backrest folded upward, the control element slides over control surfaces of the adjustment device and of the second locking element for lifting the locking element out of the locking rail and thus comes into positive engagement with the adjustment device so that, during a further adjustment of the seat frame, with the backrest folded upward, the control element is configured to drive the adjustment device in at least one spatial direction parallel to the longitudinal rail direction.

27. The motor vehicle seat of claim 24, wherein on a structural unit which is displaceable together with the seat frame in the longitudinal rail direction, an additional drive element is arranged which is configured to be engageable with the second locking element when the second locking element is lifted out of the locking rail in a memory position of the seat frame.

28. The motor vehicle seat of claim 27, wherein the second locking element has a drive surface by which the second locking element is configured to engage with the drive element when it bears with its engagement region against the locking rail, without being engaged in a locking aperture, so that the second locking element is configured to be driven by the drive element during a displacement of the seat frame in the longitudinal rail direction, until it engages in at least one locking point.

29. The motor vehicle seat of claim 1, wherein the adjustment device consist of plastics.

30. The motor vehicle seat of claim 1, wherein the adjustment device is longitudinally displaceably guided on a slide rail consisting of plastics.

31. The motor vehicle seat of claim 1 wherein the fixing device forms a counter stop which comes into engagement with a stop of the memory unit during displacement of the seat frame into the memory position.

32. The motor vehicle seat of claim 1, wherein the locking points are provided in or on a guide rail of the longitudinal rail guide to be arranged fixed to a bodywork.

33. The motor vehicle seat of claim 3, wherein the stop faces are oblique stop faces.

34. The motor vehicle seat of claim 14, wherein the control element is operatively coupled to the backrest with a Bowden cable.

35. The motor vehicle seat of claim 24, wherein the control element is pretensioned in the direction of the engagement.

* * * * *

UNITED STATES PATENT AND TRADEMARK OFFICE
CERTIFICATE OF CORRECTION

PATENT NO. : 7,578,555 B2 Page 1 of 1
APPLICATION NO. : 11/632270
DATED : August 25, 2009
INVENTOR(S) : Jochen Hofmann It is certified that error appears in the above-identified patent and that said Letters Patent is hereby corrected as shown below:

On the Title Page
Item (86) (2), (4) Date:    Delete "Jan. 11" and Insert -- Jan. 10 --

Signed and Sealed this

Sixth Day of July, 2010

David J. Kappos
*Director of the United States Patent and Trademark Office*